US012226372B2

(12) United States Patent
Gross

(10) Patent No.: US 12,226,372 B2
(45) Date of Patent: Feb. 18, 2025

(54) STORAGE CONTAINER FOR A STORAGE AND DISPENSING STATION FOR PHARMACEUTICALS

(71) Applicant: Becton Dickinson Rowa Germany GmbH, Kelberg (DE)

(72) Inventor: Dietmar Gross, Kelberg (DE)

(73) Assignee: Becton Dickinson Rowa Germany GmbH, Kelberg (DE)

( * ) Notice: Subject to any disclaimer, the term of this patent is extended or adjusted under 35 U.S.C. 154(b) by 0 days.

(21) Appl. No.: 17/174,063

(22) Filed: Feb. 11, 2021

(65) Prior Publication Data

US 2021/0161768 A1 Jun. 3, 2021

Related U.S. Application Data

(63) Continuation of application No. 16/118,976, filed on Aug. 31, 2018, now Pat. No. 10,945,924.

(51) Int. Cl.
*A61J 7/00* (2006.01)
*A61J 1/03* (2023.01)

(52) U.S. Cl.
CPC .............. *A61J 7/0076* (2013.01); *A61J 1/035* (2013.01)

(58) Field of Classification Search
CPC . A61J 1/03; A61J 1/035; A61J 7/0076; B65D 83/0409; G07F 17/0092
See application file for complete search history.

(56) References Cited

U.S. PATENT DOCUMENTS 2,227,167 A 12/1940 Warren
3,298,569 A * 1/1967 Weitzman .............. G07F 11/44 221/265

(Continued)

FOREIGN PATENT DOCUMENTS

CN 1426925 A 7/2003
CN 1871044 A 11/2006

(Continued)

OTHER PUBLICATIONS

Extended European Search Report for Application No. 18191874.9, dated Mar. 6, 2019, 6 pages including partial machine translation.

(Continued)

*Primary Examiner* — Gene O Crawford
*Assistant Examiner* — Kelvin L Randall, Jr.
(74) *Attorney, Agent, or Firm* — Morgan, Lewis & Bockius LLP

(57) ABSTRACT

A storage container for a storage and dispensing station for pharmaceuticals is provided. The storage container includes a housing, which encloses a receptacle chamber having a guide section, wherein an inner wall of the guide section defines a circular-cylindrical guide chamber. A singulating unit is arranged in the guide section of the housing having a central axis of rotation. The singulating unit has a main section and multiple projections, wherein each projection has two end sections and a middle section. One pharmaceutical duct is formed between each two end sections of adjacent projections, wherein the middle sections of the projections are recessed and one or both end sections of each projection bear on the wall of the guide section. Gaps between the singulating unit and the inner wall allow pharmaceutical dust to fall through to avoid pharmaceutical dust formed during singulation causing increased friction (Continued)

between the singulating unit and the wall of the storage container.

18 Claims, 4 Drawing Sheets

(56) References Cited

U.S. PATENT DOCUMENTS

| | | | | | |
|---|---|---|---|---|---|
| 3,327,897 | A * | 6/1967 | Weitzman | G07F 11/44 221/265 |
| 5,796,051 | A | 8/1998 | Chiari | |
| 5,803,309 | A * | 9/1998 | Yuyama | G07F 11/44 221/27 |
| 6,082,582 | A * | 7/2000 | Chiou | B23Q 7/001 221/265 |
| 6,394,308 | B1 * | 5/2002 | Yuyama | B65B 35/08 221/121 |
| 6,471,093 | B1 * | 10/2002 | Kodama | B65G 47/1457 221/277 |
| 7,258,248 | B2 * | 8/2007 | Kim | B65B 35/08 221/265 |
| 7,992,748 | B2 | 8/2011 | Lawrence | |
| D731,201 | S * | 6/2015 | Yoshinori | D6/515 |
| 9,211,232 | B2 * | 12/2015 | Bae | A61J 7/0084 |
| 9,663,260 | B2 * | 5/2017 | Morita | B65B 35/08 |
| 9,844,491 | B2 * | 12/2017 | Yoshinori | G07F 17/0092 |
| 10,335,349 | B2 | 7/2019 | Roslyakov | |
| 10,546,100 | B2 | 1/2020 | Zetterstrom | |
| 2005/0178790 | A1 | 8/2005 | Ishida | |
| 2007/0145066 | A1 * | 6/2007 | Knoth | G07F 17/0092 221/265 |
| 2009/0179041 | A1 * | 7/2009 | Young | B65G 47/1457 221/258 |
| 2009/0250485 | A1 | 10/2009 | Klingel | |
| 2011/0163112 | A1 * | 7/2011 | Takahama | G07F 17/0092 221/277 |
| 2011/0170655 | A1 * | 7/2011 | Yuyama | A61J 7/02 702/155 |
| 2012/0324828 | A1 | 12/2012 | Yasunaga et al. | |
| 2013/0062363 | A1 * | 3/2013 | Yuyama | B65B 35/08 221/82 |
| 2013/0292406 | A1 * | 11/2013 | Kim | B65D 83/0409 221/277 |
| 2016/0001956 | A1 | 1/2016 | Schmidt-Ellinger | |
| 2016/0096675 | A1 * | 4/2016 | Dai | B65D 83/0409 221/277 |
| 2016/0371916 | A1 * | 12/2016 | Omura | G07F 17/0092 |
| 2017/0351938 | A1 | 12/2017 | Hellenbrand | |
| 2018/0161247 | A1 * | 6/2018 | Koike | A61J 7/0076 |
| 2018/0221246 | A1 | 8/2018 | Hellenbrand et al. | |
| 2019/0202585 | A1 * | 7/2019 | Schmidt-Ellinger | B65D 83/0409 |

FOREIGN PATENT DOCUMENTS

| | | | |
|---|---|---|---|
| CN | 102770348 | A | 11/2012 |
| CN | 103910143 | A | 7/2014 |
| CN | 107074394 | A | 8/2017 |
| EP | 2572995 | A1 | 3/2013 |
| JP | 2013196310 | A | 9/2013 |
| JP | 6222414 | B1 | 11/2017 |
| KR | 1020150052012 | A | 5/2015 |
| WO | WO-2015052797 | A1 | 4/2015 |
| WO | WO-2017129775 | A1 | 8/2017 |
| WO | WO-2018141497 | A1 | 8/2018 |

OTHER PUBLICATIONS

International Search Report and Written Opinion for Application No. PCT/EP2019/063515, dated Aug. 6, 2019, 17 pages including English translation.

Japanese Decision to Grant for Application No. 2021-510868, dated May 30, 2023, 6 pages including translation.

Japanese Office Action for Application No. 2021-510868, dated Feb. 7, 2023, 4 pages including translation.

Japanese Office Action for Application No. 2021-510868, dated Oct. 11, 2022, 4 pages including translation.

Korean Office Action for Application No. 10-2021-7005501, dated Dec. 6, 2023, 5 pages including translation.

Chinese Notification of Grant for Application No. 201980056289.X, dated Mar. 29, 2024, 7 pages including translation.

Korean Notice of Allowance for Application No. 10-2021-7005501, dated Jul. 26, 2024, 13 pages including machine translation.

* cited by examiner

STORAGE CONTAINER FOR A STORAGE AND DISPENSING STATION FOR PHARMACEUTICALS

CROSS REFERENCE TO RELATED APPLICATIONS

This is a continuation of U.S. patent application Ser. No. 16/118,976, filed on Aug. 31, 2018, issued as U.S. Pat. No. 10,945,924 on Mar. 16, 2021, entitled "STORAGE CONTAINER FOR A STORAGE AND DISPENSING STATION FOR PHARMACEUTICALS," the disclosure of which is hereby incorporated by reference in its entirety for all purposes.

BACKGROUND

The present disclosure relates to a storage container for a storage and dispensing station for pharmaceuticals.

SUMMARY

One or more embodiments provide a storage container for pharmaceutical portions. The storage container includes a housing enclosing a receptacle chamber for pharmaceutical portions, the housing comprising a guide section and a bottom face, wherein an inner wall of the guide section defines a circular-cylindrical guide chamber and wherein the bottom face has a dispensing opening. The storage also includes a singulating unit arranged in the guide section of the housing and having a central axis of rotation. The singulating unit comprising a main section and a plurality of projections arranged on a common plane around the main section, wherein each projection has two end sections and a middle section, and a plurality of pharmaceutical ducts, wherein each pharmaceutical duct is formed between two end sections of adjacent projections. The middle sections of the projections are radially recessed in relation to at least one of the end sections and at least one end section of each projection is formed such that its outermost surface bears on the inner wall of the guide section.

One or more embodiments provide a storage container for pharmaceutical portions. The storage container includes a housing enclosing a receptacle chamber for pharmaceutical portions. The housing includes a guide section having an inner wall defining a circular-cylindrical guide chamber, a bottom face having a dispensing opening, a singulating unit disposed in the guide section. The singulating unit includes a plurality of projections disposed on a common circumferential plane, each projection having two end sections and a middle section and a plurality of pharmaceutical ducts, each pharmaceutical duct disposed between two adjacent end sections of adjacent projections. For each projection, the middle section is recessed radially in relation to the corresponding end sections and an outer surface of each end section bears on the inner wall of the guide section.

One or more embodiments provide a storage container for pharmaceutical portions. The storage container includes a housing enclosing a receptacle chamber for pharmaceutical portions. The housing includes a guide section having an inner wall defining a circular-cylindrical guide chamber, a bottom face having a dispensing opening and a singulating unit disposed in the guide section. The singulating unit includes a plurality of projections disposed on a common circumferential plane, each projection having two end sections and a middle section and a plurality of pharmaceutical ducts, each pharmaceutical duct disposed between two adjacent end sections of adjacent projections. For each projection, the middle section is recessed radially in relation to one corresponding end section and an outer surface of that end section bears on the inner wall of the guide section.

The foregoing and other features, aspects and advantages of the disclosed embodiments will become more apparent from the following detailed description and accompanying drawings.

BRIEF DESCRIPTION OF THE DRAWINGS

The device according to the present disclosure and the method according to the present disclosure are described in greater detail below, with reference to the appended drawings.

DETAILED DESCRIPTION

Figure 1A:
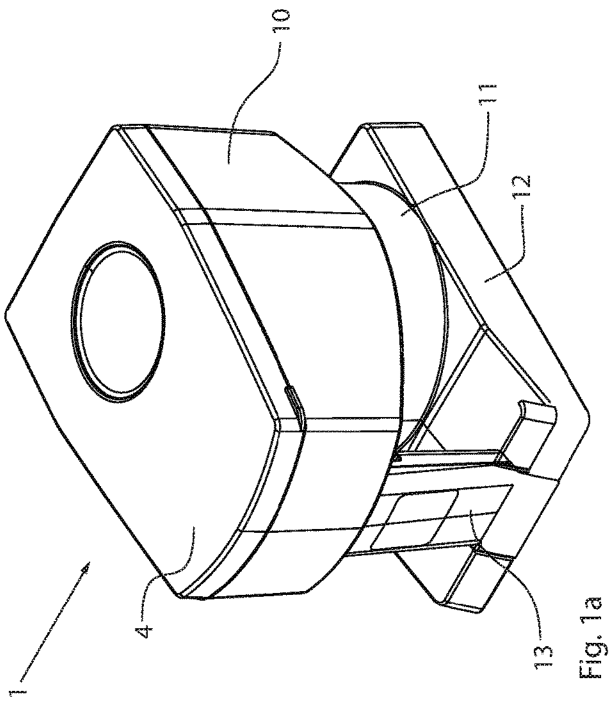
FIGS. 1*a* and 1*b* show perspective views of one or more embodiments of a storage container.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Modern blister packaging machines typically include, depending on the expansion level, several hundred storage and dispensing stations for pharmaceuticals. A plurality of pharmaceutical portions of a specific type of pharmaceutical are stored in each of these stations, and individual or multiple pharmaceutical portions can be dispensed on request. Using the blister packaging machines, the pharmaceuticals stored in the storage and dispensing stations are compiled and blister packed individually by patient according to the intake times ordered by the physician.

To compile pharmaceutical portions, corresponding storage and dispensing stations are activated to dispense one or multiple singulated pharmaceutical portions. Upon the activation of a supply and dispensing station, an individual pharmaceutical portion is separated using a singulating unit and transferred via a dispensing opening to a guide unit of the blister packaging machine. Through the guide unit, a dispensed pharmaceutical portion, possibly with a collecting unit interconnected, is supplied to a packaging unit, which blister packs individual or multiple pharmaceutical portions in accordance with the physician's instructions.

The singulating unit used for singulating pharmaceutical portions is typically in the form of a circular cylinder and is formed in a corresponding guide chamber of the storage container. A plurality of pharmaceutical ducts is provided on the circumference of the singulating unit, via which pharmaceutical portions are supplied to the dispensing opening in a bottom face of the storage container. Projections are formed between the individual pharmaceutical ducts, which are formed integrally with a main body of the singulating unit or are fastened detachably thereon. In typical storage containers, the projections regularly have a lateral surface in the form of a circular arc, which bears on an inner wall of the guide chamber, in which the singulating unit is arranged. In the context of this application, the term "bearing on" does not express that a surface contacts another surface over its entire extent, but rather that possibly a small (e.g., ring) gap is formed at least in sections. If one lays a surrounding line around the outer lateral surfaces of the projections, a circle results, the radius of which is only slightly smaller than the radius of the receptacle chamber. Typical singulating units thus have a circular footprint, excluding the pharmaceutical ducts.

A plurality of pharmaceutical portions is arranged in each of the storage containers for the storage and dispensing stations. During the singulation of a pharmaceutical portion, the singulating unit is rotated by a specific angle to supply a pharmaceutical portion arranged in a pharmaceutical duct to the dispensing opening. Depending on the shape of the pharmaceutical portion and the number of the pharmaceutical portions arranged in the storage container, they rub both against one another and also against the components of the storage container during the singulation. Spalling thus occurs in the pharmaceutical portions and a type of pharmaceutical dust forms. This accumulates on all components of the storage container, inter alia, also on the wall of the guide section in which the singulating unit is arranged.

As a result of accumulation of the pharmaceutical dust, in particular on the wall of the guide section, the friction increases between the lateral surfaces of the projections and the wall, and therefore an elevated force is to be applied for a rotation of the singulating unit in the case of increasing pharmaceutical dust accumulation. Due to the uneven force to be applied to rotate the singulating unit, it is difficult to control the singulating unit precisely, and therefore incorrect dispensing can occur, which can result in incorrect compilations of pharmaceutical portions.

It is an object of the present disclosure to provide a storage container for storage and dispensing stations in which such incorrect dispensing is avoided.

The disclosed storage container includes a housing, which encloses a receptacle chamber for pharmaceutical portions, including a guide section and a bottom face, wherein an inner wall of the guide section defines a circular-cylindrical guide chamber and wherein the bottom face has a dispensing opening. In the storage container according, a singulating unit having a central axis of rotation is arranged in the guide section of the housing. The singulating unit includes a central main section and a plurality of projections, wherein each projection has two end sections and one middle section and wherein one pharmaceutical duct is formed between each two end sections of adjacent projections.

In relation to the axis of rotation, the projections can be formed flatter than the main body of the guide unit, which assists the supply of the pharmaceutical portions to the pharmaceutical ducts. Typically, the outer lateral surface is generally in the form of a circular arc in relation to a central axis of rotation and the projections therefore form a type of hollow cylinder (excluding the pharmaceutical ducts), the outer lateral surface of which bears on the inner wall of the guide section.

The projections are formed differently in the storage container according to the disclosure. It is provided that the middle sections of the projections are recessed in relation to at least one of the end sections and the at least one end section of each projection is formed such that its outer face bears on the wall of the guide section. In the scope of this application, the concept "bears on" does not express that one surface touches another over its entire extent, but rather that possibly a narrow or small (e.g., ring) gap, which enables a rotation of the singulating unit, is formed at least in sections.

In contrast to known storage containers, it is thus provided that the projections only bear with a small section on the wall, or are spaced apart slightly therefrom, and are possibly guided by or on this wall, wherein it is provided that this section is an end section adjoined by a pharmaceutical duct. In the disclosed storage container, only a small part of the lateral surface of the projection thus bears on the wall of the guide section, namely the total of the above-mentioned end sections. It is essential that the middle sections of the projections are "recessed" in relation to the end sections, i.e., viewed radially, do not extend as far toward the wall as at least one of the end sections of each projection. In the middle sections, in comparison to the above-mentioned end sections, a wider gap is thus provided between the wall and the middle section.

Precisely, how this "gap" is geometrically formed is dependent on the outer face of the middle section. In the scope of this disclosure, the concept of the "gap" in the middle sections merely means that the distance wall/lateral surface of the middle section is greater than the distance wall/lateral surface of the end section. If the middle sections are formed curved, this has the result that the gap between wall and middle section is formed like a segment of a hollow cylinder. The middle section can also be embodied in relation to the wall like a type of secant, whereby the gap then would rather have the form of a circular segment.

A corresponding design of the projections has the result that pharmaceutical dust arising during the singulation can trickle down through the gap in the region of the middle sections and is thus guided rapidly to the bottom face, where it can be guided to a receptacle opening in the bottom face if the bottom face is designed accordingly.

The fact that the pharmaceutical dust can fall "unobstructed" through the gap between wall and middle section of the projection has the result that less pharmaceutical dust accumulates and settles on the wall. In total, the design of the projections according to the disclosure causes a reduced friction surface of wall/singulating unit, thus the force to be applied to rotate the singulating unit is less. It is essential here that the force which is required for rotating the singulating unit in the guide section also only changes slightly upon increased pharmaceutical dust formation, since less pharmaceutical dust settles on the wall. Since the force to be applied for the rotation only changes slightly in the event of dust formation, the singulating unit can be controlled and/or rotated more precisely. The probability of incorrect dispensing (e.g., due to faulty alignment of a pharmaceutical duct at the dispensing opening) is reduced in the storage container according to the disclosure.

The design of the projections according to the disclosure has a further substantial advantage. While it is difficult to avoid that pharmaceutical dust will fall down in the region of the pharmaceutical ducts, the proportion of the pharmaceutical dust falling into the ducts is reduced in relation to the total quantity of the pharmaceutical dust, and therefore less pharmaceutical dust moves to and through the dispensing opening in the bottom face. Thus, the entry of pharmaceutical dust into the blister packaging machine is avoided, which lengthens the time intervals between cleanings because of pharmaceutical dust and thus reduces the shutdown time of the blister packaging machine.

Because of the shape of the projections, these always have two end sections, wherein each of these end sections adjoins one pharmaceutical duct. At least one of these end sections bears on the wall of the guide section, and thus has a greater "radius" than the recessed middle section. The precise way in which the second end section is formed is not essential for the functioning of the disclosure. Rather, it is essential that end sections bearing on the wall enable a uniform and impact-free, low-friction rotation of the singulating unit in the guide section, which is regularly the case with three corresponding end sections and also with two end sections if they are correspondingly wide.

As described above, deposits of pharmaceutical dust also occur in the storage container. In one or more embodiments, it is therefore provided that the end sections, the outer faces of which bear on the wall of the guide section, are distributed uniformly in all projections. If only one such end section is provided per projection, this means that these end sections (viewed outward from the axis of rotation) are always arranged on the right or left on the projection. Depending on the rotational direction, the end sections bearing on the wall (e.g., "projecting" end sections in short hereafter, the projecting in relation to the middle section) are then arranged "behind" or "in front" on the projection. In the "normal" singulating operation, the rotational direction is generally selected such that the projecting end sections lie "behind," i.e., a pharmaceutical duct trails an end section. If one turns the rotational direction, the end sections lie "in front" at the projections, i.e., they trail a pharmaceutical duct in the rotational direction.

This allows for performing a cleaning of the wall of the guide section according to the disclosure, specifically by briefly rotating the singulating unit such that the projecting end sections lie "in front." With corresponding formation of the end sections, adhering pharmaceutical dust can then be removed from the wall using the front edge of the end sections. This dust then falls through the ducts onto the bottom face.

In one or more embodiments, it is provided that both end sections of a projection are formed such that they bear on the wall of the guide section. A corresponding formation improves the supply of a pharmaceutical portion into the pharmaceutical duct. The above-described cleaning is then no longer possible, but a low-friction rotation of the singulating unit and a reduction of the introduction of pharmaceutical dust into the pharmaceutical ducts are still ensured, however.

To ensure a particularly smooth rotation of the singulating unit, it is provided in one or more embodiments that the end sections of the projections bearing on the wall of the guide section, independently of whether one or both projections are formed accordingly, are distributed symmetrically over the singulating unit. If three pharmaceutical ducts and thus three projections are provided, this means that the pharmaceutical ducts are each offset by a center point angle of 120° in relation to the axis of rotation.

To avoid an adhesion of pharmaceutical dust on the wall of the middle section of the projections, it is provided in one or more embodiments that the projections have an anti-adhesive coating at least in the region of the middle section on a lateral surface facing toward the wall.

To avoid pharmaceutical portions coming to rest on the main body of the singulating unit and to assist the supply of pharmaceutical portions into the pharmaceutical ducts, it is provided in one or more embodiments that the singulating unit has a conical surface comprising a plurality of depressions aligned at the pharmaceutical ducts.

To further assist the supply, the main section may have setbacks above the pharmaceutical ducts.

Figure 1B:
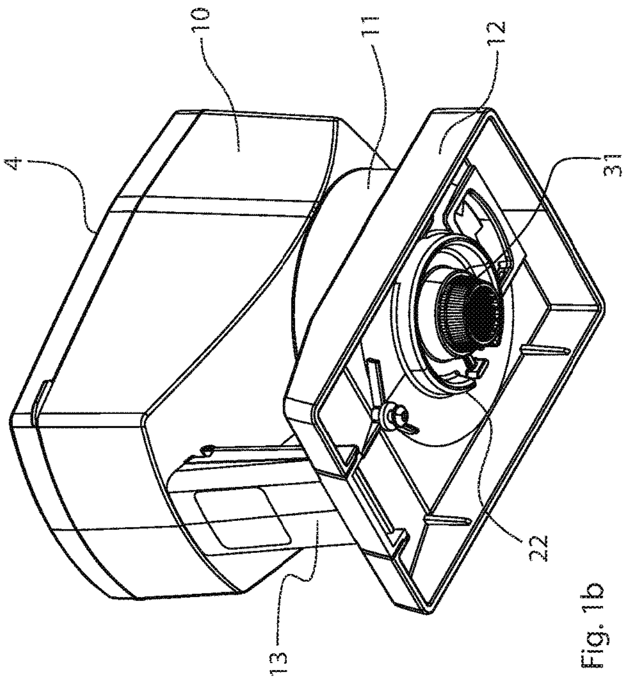

FIGS. 1*a* and 1*b* show two perspective views of one or more embodiments of the storage container 1 for a storage and dispensing station for pharmaceuticals. The storage container 1 is a part of the above-mentioned storing and dispensing station, wherein the storage container is typically detachably arranged on a dispensing station (not shown). Components can be arranged in the storage container or the dispensing station depending on the precise embodiment of the storage container according to the disclosure and of the dispensing station. As can be seen in FIG. 1*b*, which shows the storage container from below, in the embodiment shown it does not include a motor, but rather only a coupling part 31, via which a singulating unit 40 (shown in greater detail in the following figures) can be coupled to a motor in the dispensing station.

The storage container 1 includes a housing 10 having a circular-cylindrical section 11, which is adjoined on the bottom by a bottom section 12. The bottom section 12 is connected to the upper part of the housing 10 via a handle 13, by which the storage container 1 can be removed from a corresponding dispensing station. As indicated in FIG. 1*b*, a circular depression 22, which is described in greater detail in the following figures, is arranged around the coupling part 31.

Figure 2A:
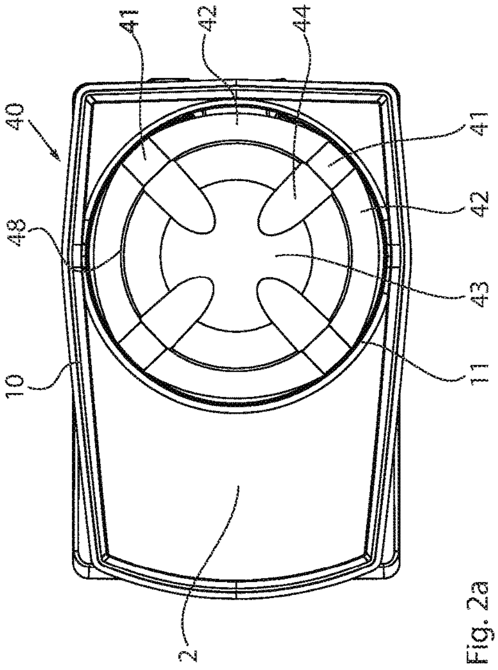
FIGS. 2*a* and 2*b* show top views of portions of the storage container of FIGS. 1*a* and 1*b*.
Figure 2B:
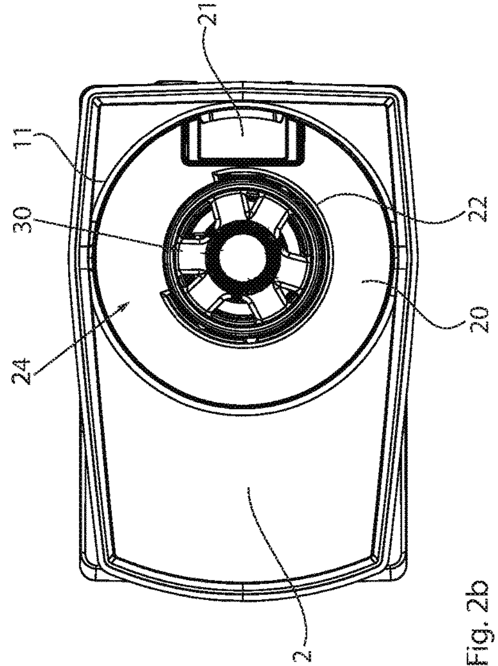

FIGS. 2*a* and 2*b* show top views of the storage container, wherein a cover 4 is omitted in both figures to illustrate the interior of the storage container 1. As can be seen in FIG. 2*a*, a singulating unit 40 is arranged in a receptacle chamber 2 defined by the circular-cylindrical section 11 of the housing. The singulating unit 40 includes a central main section 48 and a plurality of projections 42 arranged on the main section 48. These projections 42 can be integrally formed with the main section 48, however, it is also possible that they are fastenable as detachable components on the main section 48. One pharmaceutical duct 41, via which pharmaceutical portions arranged in the storage container 1 can be supplied to a dispensing opening 21 (shown in FIG. 2*b*), is formed between each two projections 42. The main section 48 of the singulating unit 40 is a conical surface 43 having four depressions 44, which are formed radially at the ducts 41 and are to assist the supply of pharmaceutical portions to the pharmaceutical ducts 41. As can be inferred from FIG.

2*a*, the projections 42 are not formed as sections of a circular hollow cylinder, but rather are recessed or flattened in the middle section in relation to the axis of rotation, i.e., in these regions a gap exists between the projections 42 and the inner wall 3 of the circular-cylindrical section 11 of the housing. The precise design of the projections 42 in relation to the circular-cylindrical section 11 will be described in greater detail hereafter.

In the top view shown in FIG. 2*b*, the singulating unit 40 is also omitted and the bottom face 20 having a dispensing opening 21 and a circular depression 22 can be seen. Pharmaceutical portions arranged in the pharmaceutical ducts 41 are dispensed via the dispensing opening 21 upon alignment of a dispensing duct (not shown) at the dispensing opening 21. The circular depression 22 is provided for accommodating pharmaceutical dust arising during the singulation of pharmaceutical portions. A circular opening 24 is provided in the middle of the bottom face 20, in which a coupling unit 30 is arranged, via which the singulating unit 40 can be coupled to a drive (not shown), which is not arranged in the storage container 1 in the embodiment shown. The coupling unit 30 itself can be integrally embodied with the singulating unit 40, but the singulating unit 40 and the coupling unit 30 are typically detachably connected to one another, to enable the rapid replacement of the singulating unit 40 without replacing the coupling unit 30.

Figure 3A:
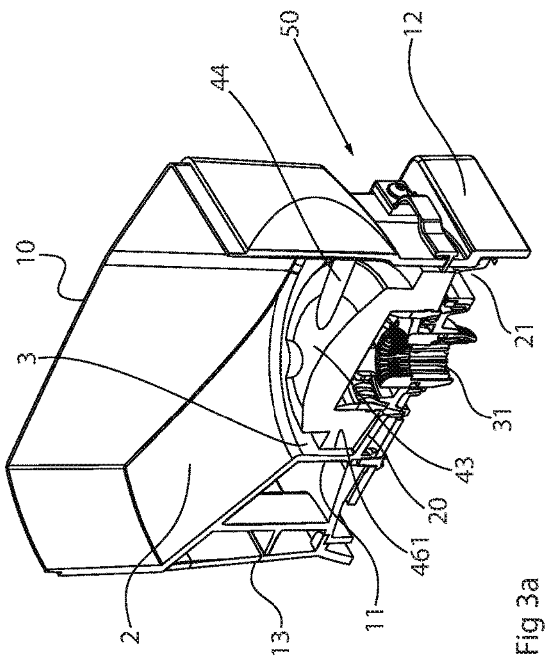
FIGS. 3*a* and 3*b* show two sectional views of the storage container of FIGS. 1*a* and 1*b*.
Figure 3B:
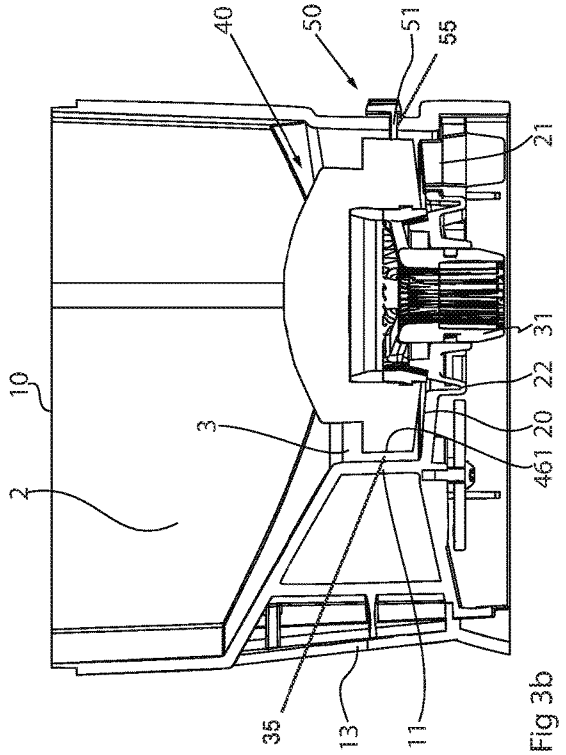

FIGS. 3*a* and 3*b* show a diagonal view and a side view of a section through the storage container 1, wherein as can be inferred in particular from FIG. 3*a*, the section cuts through the singulating unit 40 between the pharmaceutical ducts 41. As can be inferred from FIGS. 3*a* and 3*b*, a gap 35, through which pharmaceutical dust can trickle down to the bottom face 20, is provided between an inner wall 3 of the circular-cylindrical section 11 of the housing 10 and an outer lateral surface 461 of a middle section 46 (see FIG. 5*e*) of a projection 42. The precise structure of the projections 42 is described with reference to the following figures.

In FIGS. 3*a* and 3*b* and all following figures, the gap 35 between the wall 3 and the outer lateral surface 461 of a middle section 46 of a projection 42 is shown exaggeratedly large to illustrate the disclosure. In reality, such a gap 35 is embodied narrower, wherein the precise dimensioning is dependent in particular on the shape of the pharmaceutical portions to be singulated. In the case of larger pharmaceutical portions, where larger quantities of pharmaceutical dust can possibly also be expected, the gap 35 can self-evidently be kept wider than in the case of very small pharmaceutical portions. It is essential that a corresponding gap 35 is provided, via which pharmaceutical dust can move past the singulating unit 40 to the bottom face 20.

As can be seen in FIG. 3*a*, a slot 55 is introduced into the circular-cylindrical section 11 in the region of the bottom opening 21, through which a retention section 51 of a retention device 50 is inserted. The retention section 51 prevents pharmaceutical portions arranged above the pharmaceutical duct 41 from being dispensed through the pharmaceutical duct 41 upon alignment of the pharmaceutical duct 41 at the dispensing opening 21. Thus, only the pharmaceutical portion contained in the dispensing duct (not shown) upon alignment is dispensed.

Figure 4A:
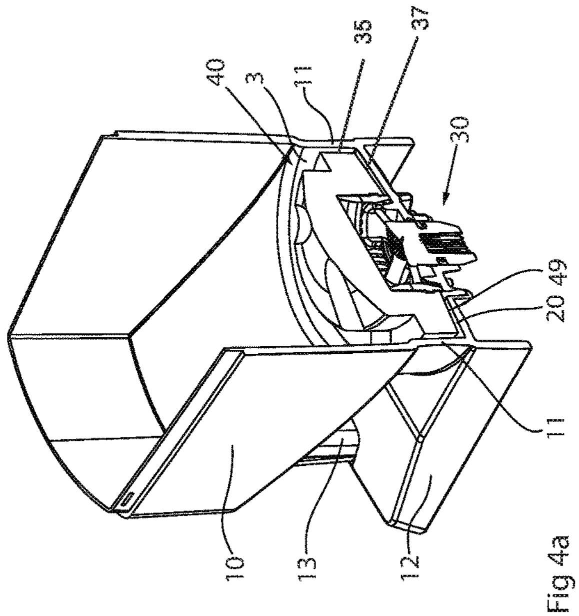
FIGS. 4*a* and 4*b* show two sectional views of the storage container of FIGS. 1*a* and 1*b*, orthogonal to the sectional views illustrated in FIGS. 3*a* and 3*b*.
Figure 4B:
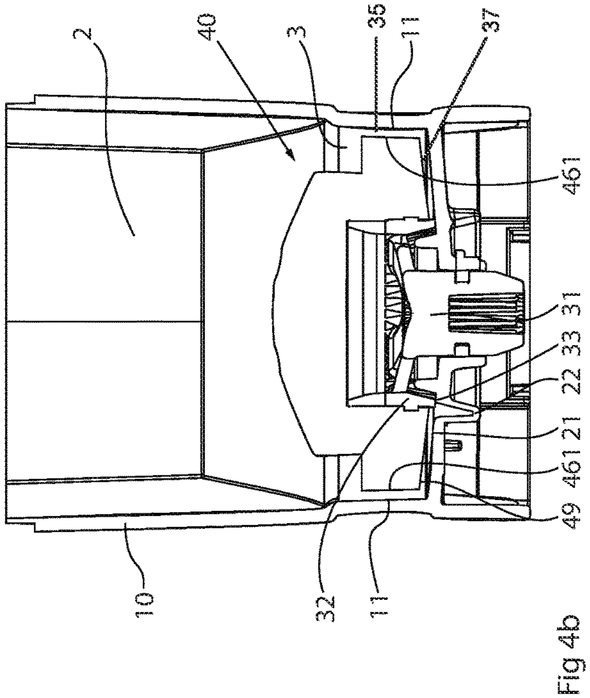

FIGS. 4*a* and 4*b* also show two sectional views, wherein the section is guided orthogonally to that from FIGS. 3*a* and 3*b*. It can also be seen on the basis of FIGS. 4*a* and 4*b* that a gap 35 is formed between the inner wall 3 of the circular-cylindrical section 11 and a lateral surface 461 of the middle section 46 of a projection 42. As can also be inferred from FIGS. 3*a*, 3*b*, 4*a* and 4*b*, the bottom face 20 is formed sloping toward the middle and comprises a depression 22, and therefore pharmaceutical dust trickling down via the gap 35 can move into the depression 22 via the sloping bottom face. Furthermore, it can be inferred from FIGS. 4*a* and 4*b* that the lower face 49 of the singulating unit 40 is also formed diagonally, and therefore a gap 37 is formed between the bottom face 20 and the singulating unit 40, via which pharmaceutical dust can move to the depression 22. An interior wall 32 of the singulating unit 40 may receive at least part of the coupling part 31. An interior wall bottom 33 may extend below the lower face 49 of the singulating unit 40 and into the gap 37, further facilitating movement of the pharmaceutical dust to the depression 22 and blocking the pharmaceutical dust from contacting the coupling part 31.

FIGS. 5*a*-5*f* show various views of the singulating unit 40, wherein the coupling part 31 of the coupling unit 30 is shown together with the singulating unit 40. Firstly, the general structure of the singulating unit 40 is described on the basis of FIGS. 5*a*-5*d*, details of the design of the projections 42 according to the disclosure are described with reference to the following figures. The singulating unit 40 includes four ducts 41, which are defined by four projections 42. The projections 42 may have anti-adhesive coating 52. The main body 48 extends beyond the projections 42, i.e., a circumferential depression, which assists the supply of the pharmaceutical portions into the ducts 41, is formed in the region of the projections 42. The singulating unit 40 includes a conical upper face 43 having four depressions 44, which are aligned at the pharmaceutical ducts 41. Recesses 47 are formed in the main body 48 which, in cooperation with the depressions 44, assist the supply of pharmaceutical portions into the pharmaceutical ducts 41, are aligned at the depressions 44 and the pharmaceutical ducts 41.

Figure 5A:
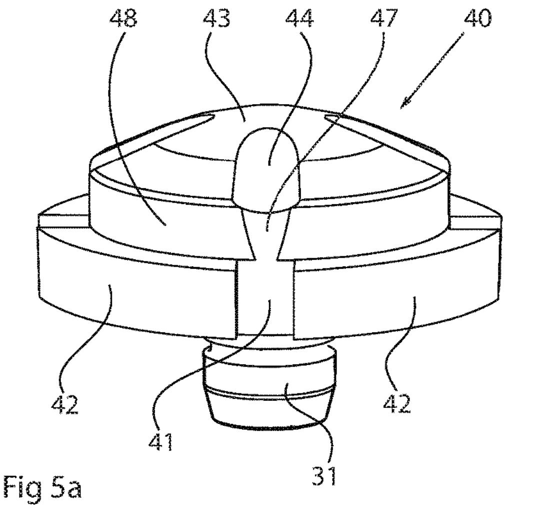
FIGS. 5*a*-5*f* show various views of a singulating unit of one or more embodiments of a storage container.
Figure 5B:
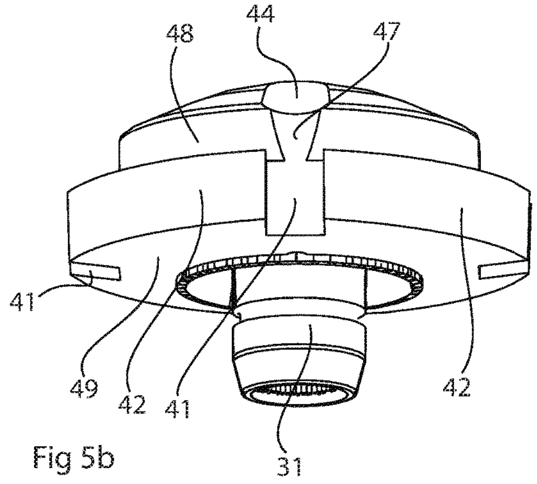
Figure 5C:
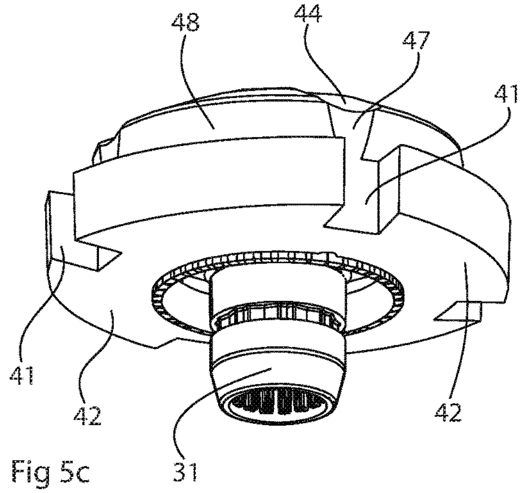
Figure 5D:
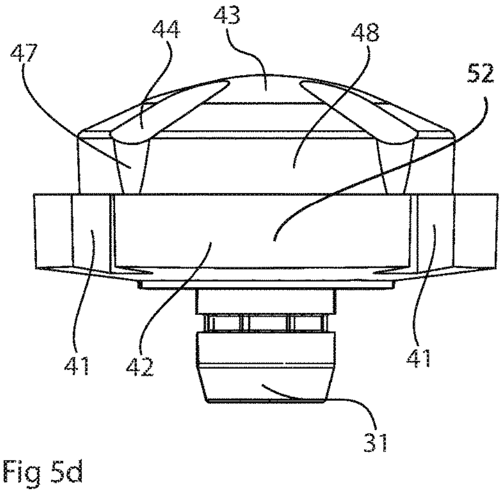
Figure 5E:
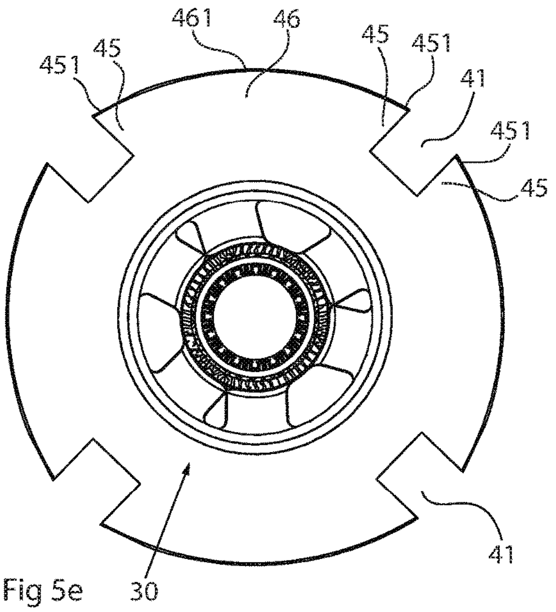
Figure 5F:
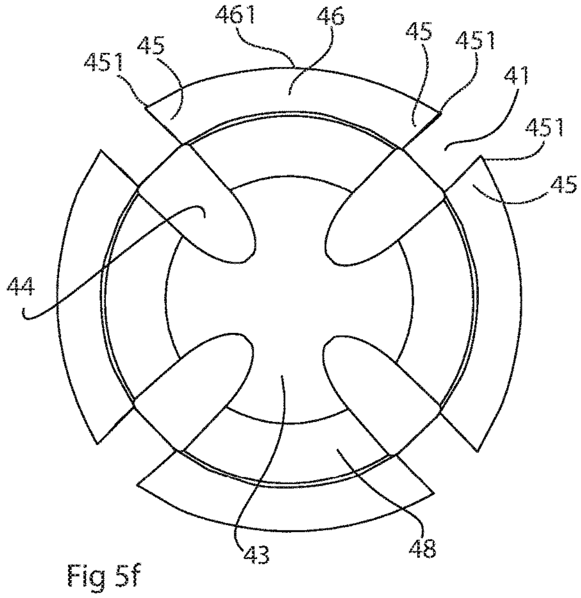

As can be inferred from FIGS. 5*e* and 5*f*, the projections 42 each include two end sections 45 having lateral surfaces 451 and middle sections 46 having lateral surfaces 461. It can already be seen in FIGS. 5*e* and 5*f* that the projections 42 are not in the form of a circular arc in relation to the central axis of rotation, but rather the middle sections 46 are recessed in relation thereto, i.e., the radius is less in the case of the middle sections 46 than the radius in the case of the end sections 45. This is explained in greater detail with reference to the following figures.

Figure 6A:
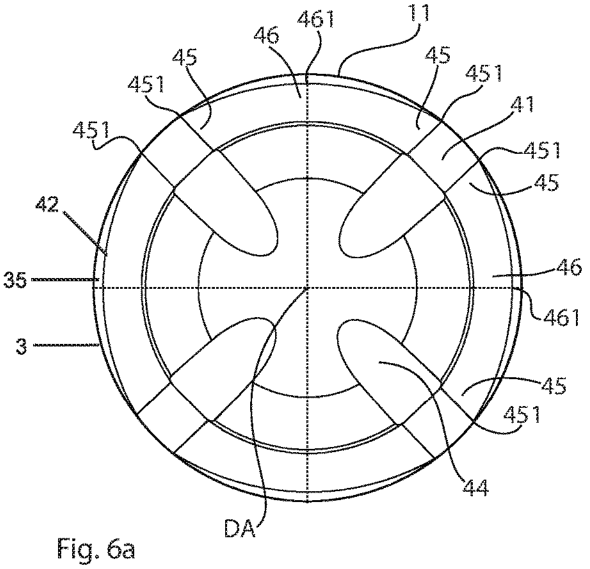
FIGS. 6*a* and 6*b* show top views of the singulating unit of FIGS. 5*a*-5*f*.
Figure 6B:
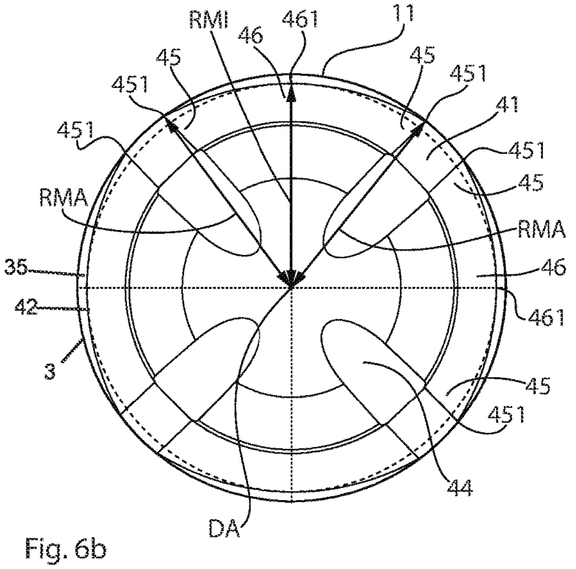

FIGS. 6*a* and 6*b* show the arrangement of the singulating unit 40 in the circular-cylindrical guide chamber provided by the guide section 11 having the inner wall 3. Here, the singulating unit 40 includes four ducts 41 and four projections 42. As can be seen in FIGS. 6*a* and 6*b*, the projections 42 bear with lateral surfaces 451 on the wall of the guide section 11 in the region of the end sections 45, while in contrast a lateral surface 461 of a middle section 46 of a projection 42 does not bear on the wall 3, but rather a gap 35 is formed between the lateral surface 461 and the wall 3. The pharmaceutical dust arising during the singulation can move past the singulating unit 40 via this gap 35 to the bottom face 20 of the storage container 1. As illustrated in FIG. 6*b*, the radius RMA (i.e., the distance of the lateral surface 461 to the central axis of rotation DA) is greater in the end sections 45 than the radius RMI in the middle sections 46.

Figure 7:
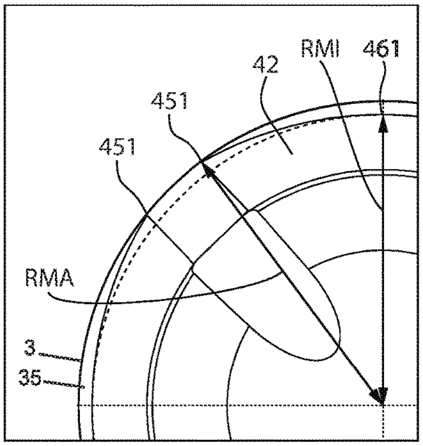
FIG. 7 shows a detail view of a portion of the singulating unit of FIGS. 5*a*-5*f*.

This is shown in detail in FIG. 7, where it can be clearly seen that the projections 42 bear on the wall 3 of the guide section 11 in the region of the end sections 45, are then set back and leave a gap 35 open, through which the pharmaceutical dust can move to the bottom face 20.

Figure 8:
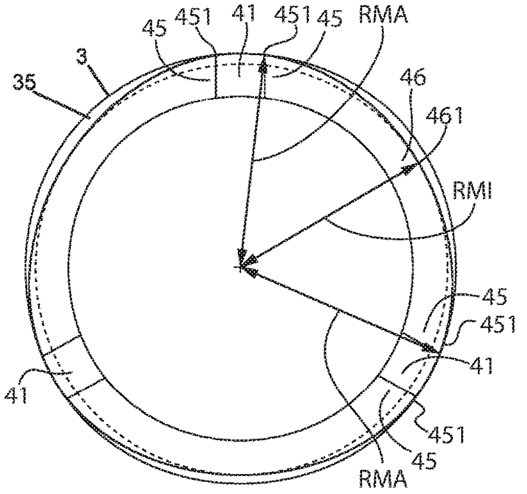
FIG. 8 shows a top view of a singulating unit of one or more embodiments of a storage container.

FIG. 8 shows a top view of one or more embodiments of a singulating unit 40, which is substantially formed corresponding to the above-described embodiment, with the exception that only three pharmaceutical ducts 41 are provided.

Figure 9:
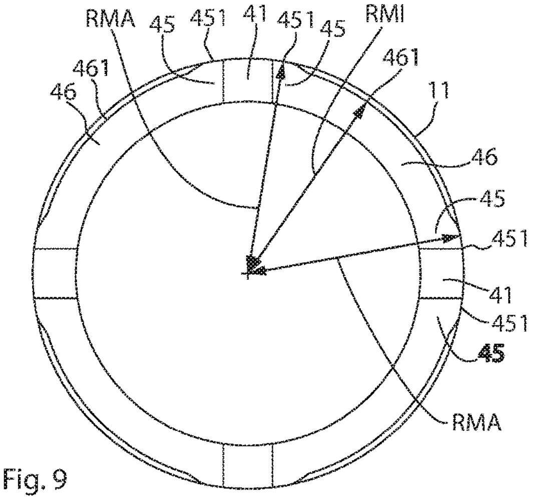
FIG. 9 shows a top view of a singulating unit of one or more embodiments of a storage container.

FIG. 9 shows one or more embodiments of the singulating unit 40, wherein both end sections 45 of a projection 42 also project in relation to the middle section 46, i.e., the radius RMA in the case of the end sections 45 is greater than the radius RMI in the case of the middle sections 46. Here, the middle section 46 is in the form of a circular arc in relation to the central axis of rotation and rises softly in the transition region to the end sections 45. In one or more embodiments, the middle section 46 can also be formed in that it is not in the form of an arc, but rather a straight line is simply formed between the end sections 45, which would result in a gap 35 having a different shape.

Figure 10:
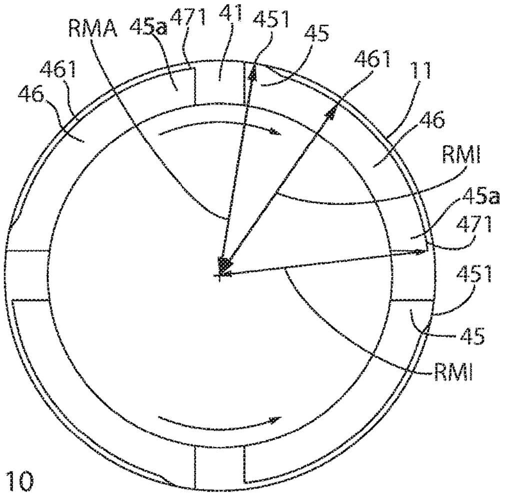
FIG. 10 shows a top view of a singulating unit of one or more embodiments of a storage container.

FIG. 10 shows one or more embodiments of the singulating unit 40. Here, only one of the end sections 45 of a projection 42 is projecting with respect to the middle section 46, i.e., the radius RMA is only greater in the case of one of the end sections 45 than the radius RMI of the middle section 46. The "other" end section **45*a* is formed precisely like the middle section 46 in the embodiment shown, i.e., the lateral surface 471 is formed in the region corresponding to the lateral surface 461 of the middle section 46**.

During the singulation of pharmaceutical portions, the singulating unit 40 according to the embodiment shown is generally rotated clockwise, i.e., the projecting end sections 45 run "in front" of a pharmaceutical duct 41 toward the dispensing opening 21, which is arranged below the right pharmaceutical duct 41 in the embodiment shown. During a rotational movement counterclockwise, the projecting end sections 45 trail the pharmaceutical ducts 41. The edges of the projecting end sections 45 formed in the illustrated embodiment are suitable at the transition end section/pharmaceutical duct 41 of detaching pharmaceutical dust adhering to the wall 3 therefrom. Using a correspondingly designed singulating unit 40, it is therefore possible by way of brief rotational movements counterclockwise to detach at least a part of the pharmaceutical dust adhering to the wall 3 therefrom and to supply it to the bottom face 20 and possibly a depression provided therein. In this manner, excess accumulation of pharmaceutical dust on the wall 3 can be avoided, and a continuous increase of the friction between singulating unit 40 and wall 3 is avoided.

It is furthermore ensured in the above-described embodiments by the design of the projections 42 according to the disclosure that the friction between the singulating unit 40 and the wall 3 is reduced in relation to known storage containers as a result of the reduced contact surface wall/lateral surface.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A storage container for pharmaceutical portions, comprising:

a housing enclosing a receptacle chamber for pharmaceutical portions, the housing comprising a guide section and a bottom face, wherein an inner wall of the guide section defines a circular-cylindrical guide chamber and wherein the bottom face has a dispensing opening;

a singulating unit arranged in the guide section of the housing and having a central axis of rotation, the singulating unit when viewed from above comprising a main section and a plurality of projections arranged around the main section, wherein each projection has a first end section outer wall, a second end section outer wall and a middle section outer wall collectively forming a single radial surface disposed in a parallel plane to the bottom face and laterally and circumferentially in perpendicular relation to a central axis of rotation, and a plurality of pharmaceutical ducts, wherein each pharmaceutical duct is formed between adjacent end sections of adjacent projections; and wherein for each projection the middle section outer wall and the first end section outer wall are radially recessed the same distance and closer to the central axis of rotation than the second end section outer wall the second end section outer wall formed such that its outermost surface bears on the inner wall of the guide section.

2. The storage container of claim 1, wherein the second end section outer walls having lateral surfaces that bear on the wall of the guide section are distributed uniformly around the central axis of rotation.

3. The storage container of claim 1, wherein the second end section outer walls of the projections bearing on the wall of the guide section are distributed uniformly over the singulating unit.

4. The storage container of claim 1, wherein the projections have an anti-adhesive coating at least in a region of the middle section outer wall facing toward the wall of the guide section.

5. The storage container of claim 1, wherein the singulating unit has a conical surface comprising a plurality of depressions.

6. The storage container of claim 5, wherein the plurality of depressions are aligned at the pharmaceutical ducts.

7. The storage container of claim 1, wherein the main section has setbacks above the pharmaceutical ducts.

8. The storage container of claim 1, wherein the singulating unit has four projections and four pharmaceutical ducts.

9. The storage container of claim 1, wherein the singulating unit has three projections and three pharmaceutical ducts.

10. The storage container of claim 1, wherein a vertical height of each of the plurality of projections and each of the plurality of pharmaceutical ducts is the same.

11. A storage container for pharmaceutical portions, comprising:

a housing enclosing a receptacle chamber for pharmaceutical portions, the housing comprising:
- a guide section having an inner wall defining a circular-cylindrical guide chamber; and
- a bottom face having a dispensing opening; and a singulating unit disposed in the guide section, the singulating unit comprising:
- a plurality of projections disposed on a common circumferential plane, each projection having two end sections and a middle section; and
- a plurality of pharmaceutical ducts, each pharmaceutical duct disposed between two adjacent end sections of adjacent projections, wherein for each projection, the middle section is recessed radially in relation to the corresponding end sections and an outer surface of each end section bears on the inner wall of the guide section.

12. The storage container of claim 11, wherein the end sections of the projections are distributed uniformly over the singulating unit.

13. The storage container of claim 11, wherein the projections have an anti-adhesive coating in at least a portion of the middle section on a lateral surface facing toward the wall.

14. The storage container of claim 11, wherein the singulating unit has a conical surface comprising a plurality of depressions aligned at the pharmaceutical ducts.

15. A storage container for pharmaceutical portions, comprising:

a housing enclosing a receptacle chamber for pharmaceutical portions, the housing comprising:
- a guide section having an inner wall defining a circular-cylindrical guide chamber; and
- a bottom face having a dispensing opening; and a singulating unit disposed in the guide section, the singulating unit when viewed from above comprising:
- a plurality of projections disposed circumferentially in relation to a central axis of rotation, each projection having a first end section outer wall, a second end section outer wall and a middle section outer wall collectively forming a single radial surface disposed in parallel to the bottom face, the radial surface being laterally, circumferentially and perpendicularly oriented to the central axis of rotation; and a plurality of pharmaceutical ducts, each pharmaceutical duct disposed between adjacent end sections of adjacent projections, wherein for each projection, the middle section outer wall and the first end section outer wall are recessed radially closer to the central axis of rotation than the second end section outer wall and an outer surface of the second end section outer wall bears on the inner wall of the guide section, and wherein the middle section outer wall is recessed radially equally to the central axis of rotation as the first end section outer wall.

16. The storage container of claim 15, wherein the second end section outer walls of the projections are distributed uniformly over the singulating unit.

17. The storage container of claim 15, wherein the projections have an anti-adhesive coating in at least a portion of the middle section outer wall facing toward the wall of the guide section.

18. The storage container of claim 15, wherein the singulating unit has a conical surface comprising a plurality of depressions aligned at the pharmaceutical ducts.

* * * * *